United States Patent [19]

Ju et al.

[11] Patent Number: 5,079,663
[45] Date of Patent: Jan. 7, 1992

[54] MAGNETORESISTIVE SENSOR WITH TRACK FOLLOWING CAPABILITY

[75] Inventors: Kochan Ju; Mohamad T. Krounbi; Po-Kang Wang, all of San Jose, Calif.

[73] Assignee: International Business Machines Corporation, Armonk, N.Y.

[21] Appl. No.: 471,576

[22] Filed: Jan. 29, 1990

[51] Int. Cl.⁵ .......................... G11B 5/39; G11B 5/58
[52] U.S. Cl. ................................ 360/113; 360/77.01; 360/77.06
[58] Field of Search ............... 360/77.01, 77.02, 77.06, 360/77.12, 113

[56] References Cited

U.S. PATENT DOCUMENTS

| | | | |
|---|---|---|---|
| 3,918,091 | 11/1975 | Walraven et al. | 360/77 |
| 4,012,781 | 3/1977 | Lin | 360/113 |
| 4,633,344 | 12/1986 | Jeffers | 360/77 |
| 4,814,919 | 3/1989 | Kitada et al. | 360/113 |
| 4,851,944 | 7/1989 | Mowry | 360/113 |

OTHER PUBLICATIONS

D. H. Martin, "Data-Track-Following Servo System", IBM Technical Disclosure Bulletin, vol. 19, No. 8, Jan. 1977, pp. 3228-3229.

Primary Examiner—Aristotelis Psitos
Assistant Examiner—David L. Robertson
Attorney, Agent, or Firm—Otto Schmid, Jr.; James A. Pershon

[57] ABSTRACT

A magnetoresistive (MR) sensor is center tapped to provide the difference signals for servo operation on data and sum signals for the data information. The center-tap of the MR sensor is made of a high resistivity material compared to the resistivity of the MR element itself such as tantalum, Nichrome and carbon. Processes which can be used to produce the high resistivity center-tap conductor include an insulator layer to define both the track width and the center-tap conductor and a sequence which first patterns the MR sensor and then masks to define the conductor regions.

13 Claims, 2 Drawing Sheets

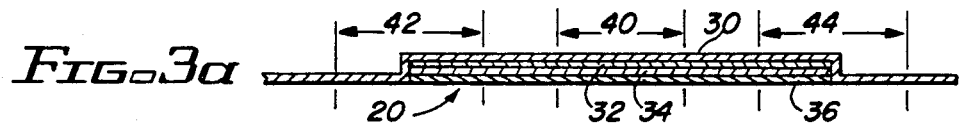
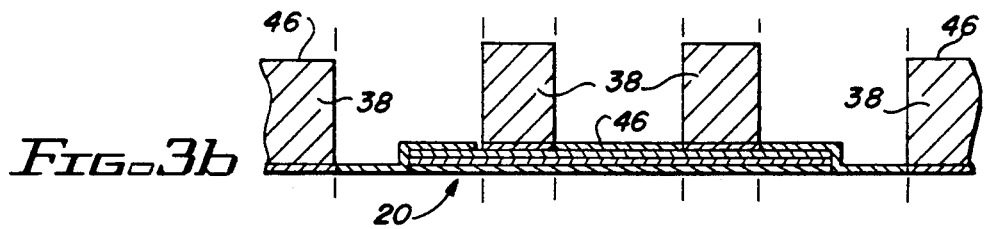
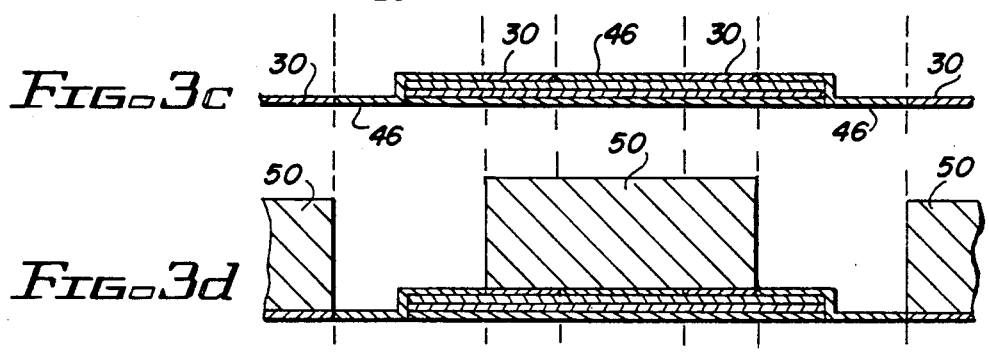
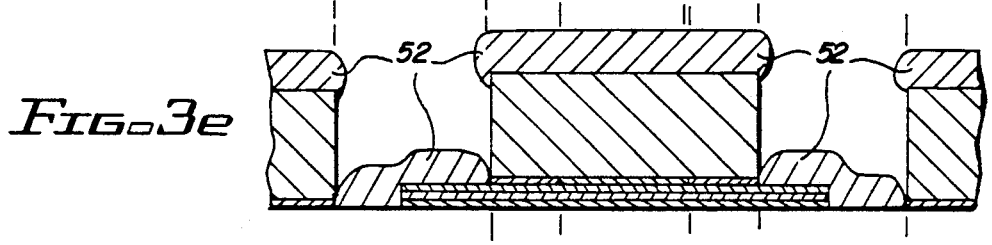
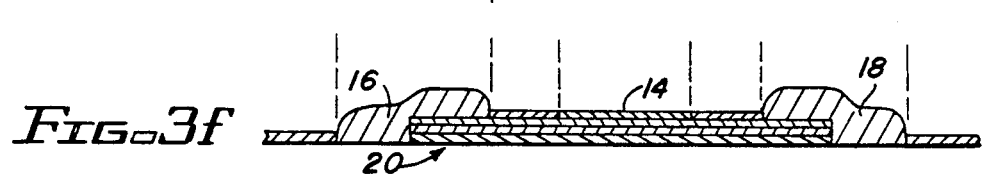
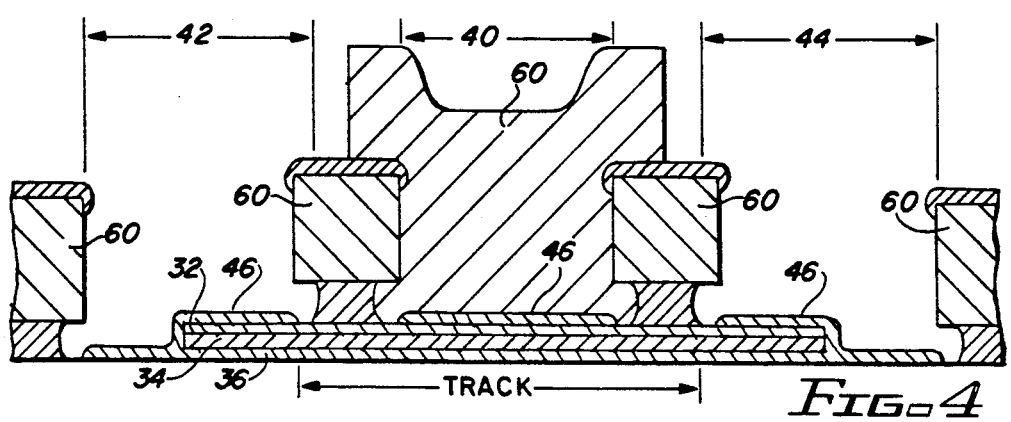

MAGNETORESISTIVE SENSOR WITH TRACK FOLLOWING CAPABILITY

FIELD OF THE INVENTION

This invention relates in general to a magnetoresistive transducer and more particularly to a magnetoresistive head which provides tracking control during the playback of recorded signal information.

BACKGROUND OF THE INVENTION

It has long been known that a magnetoresistive element, commonly used to read magnetic information from a track written onto a magnetic media, could be used in a center-tapped configuration to control the position of the entire magnetic head with respect to the information track that the MR element is following, see U.S. Pat. No. 3,918,091 to Walraven, et al. The difference of the voltages across each outside conductor and the center conductor is said to be indicative of the position of the head. The U.S. Pat. No. 4,633,344 shows a center-tapped MR element for providing a tracking servo signal using the signals derived from the data on the track. This patent discloses a particular circuitry for differentiating between the servo signal and the data signal itself. The center-tapped MR sensors provides an excellent means of getting away from the traditional servo system where the positioning servo information is recorded on a separate, dedicated disk surface in the disk stack or the problems encountered by embedding the servo information on the track on which the head is used, such as a sector servo with microsectors. The sector servo information takes up disk space which could otherwise be used for storing data, thus making it impossible to have continuous feedback of position error signal during reading and writing. The center-tapped MR sensor solved this problem by deriving the position servo signal directly from the actual data. The straight forward design of adding a center-tap lead connection to the center of the MR transducer resulted in problems. The conductor pad at the center of the MR sensor disturbed the magnetic bias and shorted out the center portion of the sensor. This made the center-tapped MR sensor incompatible with narrow track applications. A three terminal MR transducer design with the aim of removing the dead center at the center of the MR sensor is described in U.S. Pat. No. 4,012,781 to Lin and assigned to the assignee of the present invention. The head actually included two MR sensing elements separated by an insulating layer. The center conductors are positioned such that the active regions of the two MR sensors line up to form one continuous active region. Besides additional process steps required to make the two separate elements, the design has a few limitations solved by the present invention. First, since the position servo signal is derived as the difference of the output of the two MR sensors, to give a zero difference signal when the head is on track, the sensitivity of the two MR sensors must be equal. This is difficult to accomplish since the two MR sensors are fabricated at different steps and therefore allowances must be made in the circuitry to allow for the differences. Second, if the magnetic head is also used to read data, the phase lag between the outputs of the two MR sensors must be accommodated in the circuitry since the sensors are each reading a portion of the data at a slightly different time, depending on the thickness of the insulating layer and the velocity of the disk media.

It is, therefore, an object of the present invention to provide an MR sensor with a center tap that overcomes the disadvantages of the prior art.

Another object of the present invention is to provide an MR sensor that includes a center tap in order to servo on the data that does not degrade the sensitivity of the MR sensor.

A further object of the present invention is to provide a center tap MR sensor wherein the center tap is self aligned to the outer conductors and the two sections of the MR sensor are thereby identical in physical as well as magnetic properties.

SUMMARY OF THE INVENTION

In accordance with the present invention, the magnetoresistive (MR) transducer head assembly for use with a servo positioned system incorporates a center-tapped MR element wherein the center-tap conductor is made of a higher resistivity material or has a high resistivity structure such that the center-tap does not introduce the dead zone at the center of the MR element. The high resistivity center tap must not disturb the magnetic configuration or bias of the MR element.

In accordance with the preferred embodiment, the magnetoresistive transducer head assembly for use with a servo conditioning system incorporates the center-tap conductor made of a high resistivity material such as tantalum, Nichrome, or sputtered carbon film, for instance. The high resistivity center-tap conductor does not disturb the magnetic configuration or bias of the MR element.

An object of the present invention, therefore, is to provide an enhanced head assembly using magnetoresistive elements.

Another object of this invention is to provide the magnetoresistive element with a center-tap conductor and connected for improved servo positioning operation.

Yet another object is to provide a servo sensing head assembly having a magnetoresistive element which includes a high resistivity center-tap conductor.

A process for making the high resistivity center-tapped MR element is described that uses a thin insulator to define both the track and the center-tap conductor. First, the MR element structure is deposited onto a substrate and patterned. A thin insulating layer is deposited over the structure. A photoresist masking layer is formed to define both the center-tapped region as well as the conductor region. A selective etch removes the insulator layer. A high resistivity center-tapped conductive material is then deposited. The photoresist is then lifted off. A photoresist masking layer is then used to protect the center-tap region while exposing the previously defined outer conductor in the insulating layer. The high resistivity layer is etched away and the exchange and conductor metallurgy is deposited. The photoresist is then removed.

It is, therefore, another object of the present invention to provide a process for forming a center-tap MR element according to the present invention.

A second process embodiment follows the sequence of first patterning MR element structure and applying the photoresist masking layer to define both the center-tap conductor region as well as the outer conductor region. The high resistivity center-tap conductor material is then deposited. The photoresist masking layer is then formed to protect the center-tap conductor region while exposing the previously defined outer conductor edge regions in the first resist layer. The high resistivity conductor layer is then etched. The outer conductor metallurgy is then deposited and the photoresist is removed.

Still another object is to provide a process for forming the magnetoresistive head assembly having a high resistivity center tap to provide a servo signal from magnetic data transitions.

These and other objects of the present invention will become apparent to those skilled in the art as the description proceeds.

BRIEF DESCRIPTION OF THE DRAWING

The various novel features of this invention, along with foregoing and other objects, as well as the invention itself both as to its organization and method of operation is more fully understood from the following description of illustrated embodiments when read in conjunction with an accompanying drawing, wherein:

FIG. 3A-F show one process sequence to produce a magnetoresistive element as shown in FIG. 2; and FIG. 4 shows a second fabrication process approach to make the center-tap magnetoresistive element as shown in the FIG. 2.

DETAILED DESCRIPTION OF THE PREFERRED EMBODIMENT

Figure 1:
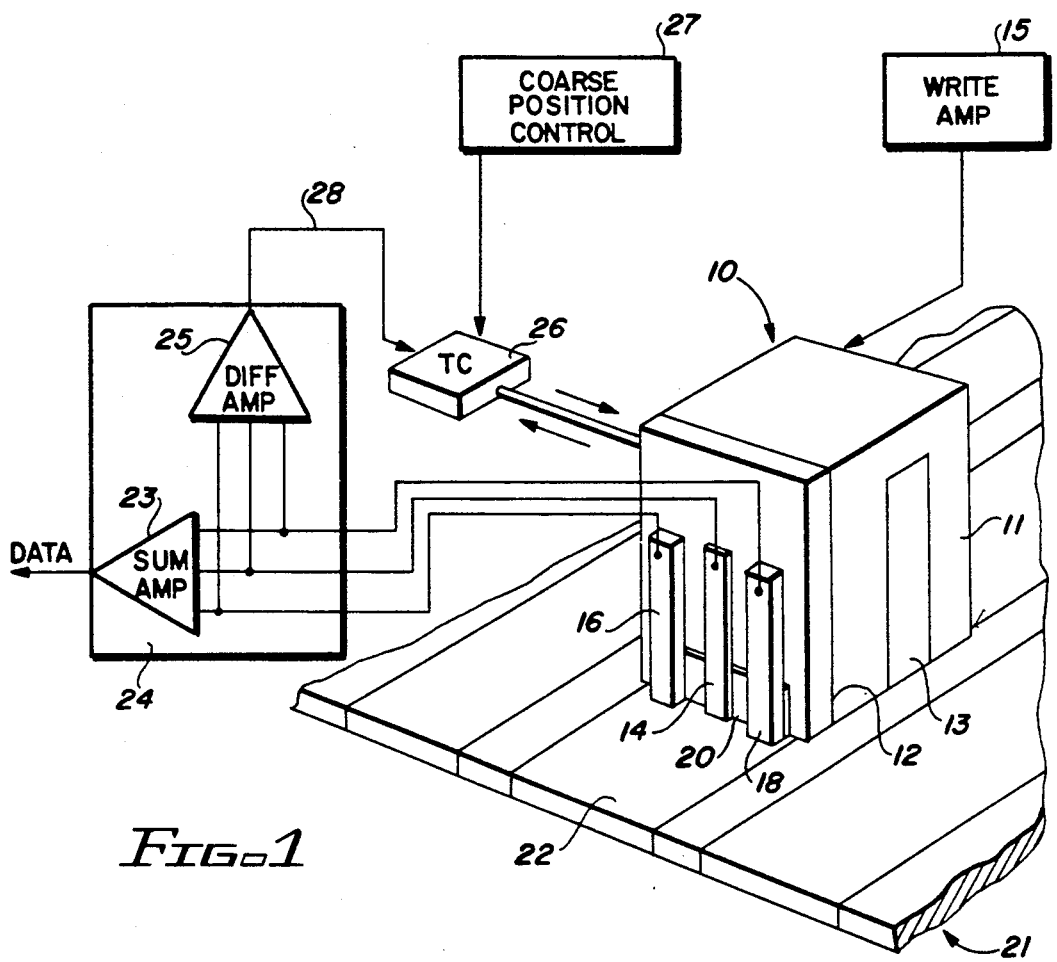
FIG. 1 is a schematic diagram, including a perspective view of a magnetoresistive head element useful in read data from a magnetic data track as well as providing servo control information to center the head over the track.

The present invention is preferable for use in a magnetic head assembly that includes write elements as well as the magnetoresistive read elements. Since information can be played back but cannot be recorded with a magnetoresistive element, a magnetoresistive playback head such as is shown in FIG. 1 will, in most applications, be combined with a write element. The gap of the recording element and the magnetoresistive read element should be located as closely together as possible. The magnetoresistive element of the present invention could therefore be combined with a write element, such as is shown in the U.S. Pat. No. 4,012,781 to Lin and assigned to the assignee of the present invention. The substitution of the magnetoresistive element according to the present invention for the magnetoresistive element of the Lin patent could be undertaken by a person skilled in the art of thin film head manufacturing. It is therefore not believed to be necessary to completely describe the magnetic head assembly. It is sufficient for the purposes of this invention that the magnetoresistive element according to the figures and this detailed description will be sufficient to describe the present invention.

Referring to FIG. 1, a magnetic head assembly 10 includes a magnetoresistive (MR) element 20 shown placed on a non-magnetic support 12. The head 10 includes a write element 11 with a magnetic gap 13 adjacent to the MR element 20 and controlled by a write amplifier 15. A center-tap lead 14 and two outer leads 16 and 18, connect to the magnetoresistive element 20. The head 10 is adapted to ride along a magnetic recording track 22 containing data signals and in response to the fields associated with such signals, supply playback signals to a tracking control and playback electronics shown as amplifier 24. The amplifier 24 processes the playback signals for the recovery of the recorded data as shown by the data line from the amplifier 24. In addition, the amplifier 24 provides positional tracking of the head 10 to the track 22 through a tracking control (TC) device 26. The TC device 26, in a manner to be more thoroughly discussed later, takes the signals from the amplifier 24 read by the MR element 20 from the track 22 and positions the head 10 directly over the track 22 such that the MR element 20 is correctly centered onto the track 22. The operation of the MR element 20 to read the data signals from the track 22 is well known in the art and will not be further described here. Further, the operation of a center-tapped MR element to provide a data track following servo system is also well known in the art.

An automatic gain control circuit usable in the amplifier 24 to accomplish a data track following servo system is shown in the IBM Technical Disclosure Bulletin, Vol. 19, No. 8, January 1977, at pages 32289. In this circuit, the outputs from the center-tapped MR element are directed to a differential amplifier 25 to produce a signal on a line 28, for instance, which can be directed to the tracking control device 26 to control the final positioning of the head 10. The coarse positioning of the head 10 is generally controlled by a coarse position control 27 in a manner known in the art. The data signal is sensed across the entire MR element 20 through the outer leads 16 and 18 which also end the system according to the aforementioned article produces the data out signal. Thus it is the differences between the center-tap 14 and the outer leads 16 and 18 that produce the track following servo signal to control the tracking control device 26 and it is the signal sensed across the outer leads 16 and 18 that produce the data signals from a summation amplifier 23 in the amplifier 24. A most important attribute of a center-tapped MR element is that the center-tapped lead 14 provide the differential signal while not interfering with the reading of the data signal. The MR element, according to the present invention, does not effect the magnetic bias of the sensor and includes a center-tap that does not degrade the sensitivity of the head in reading the data signals is shown in FIG. 2.

Figure 2:
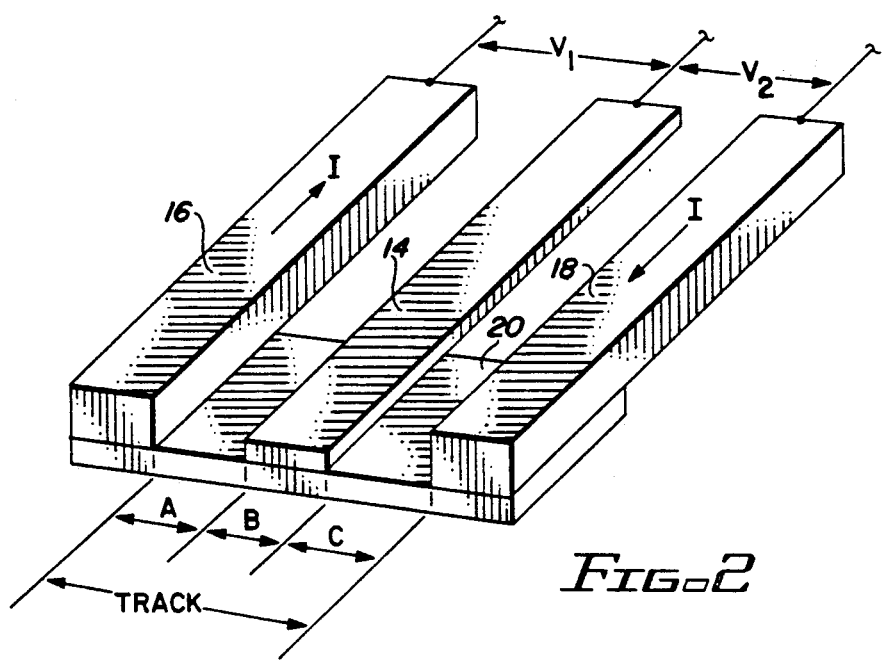
FIG. 2 is a perspective view of the magnetoresistive element as shown in FIG. 1.

Referring to FIG. 2, like elements are shown with the same reference numerals as that shown in FIG. 1. The substrate 12 is not shown in order to better describe the invention. The MR element 20 can be made of any standard magnetoresistive material such as nickel-iron in the standard percentages of each element such as that used to form Permalloy. The outer leads 16 and 18 are deposited over the ends of the MR element and can be made of any of the standard conductor materials, such as copper or gold. The outer leads 16 and 18 essentially desensitize the MR element such that the sensing of the magnetic transitions from the track 22 are sensed by the active region of the MR element 20, shown in three portions A, B and C. The active region of the sensor, having a resistance R, includes all three sections A, B and C in FIG. 2. The output voltages from the three conductors, with an input current I, are $$V1 = I(R/2 + SRA + SRB/2) \text{ and}$$

$$V2 = I(R/2 + SRC + SRB/2);$$

where SRA, SRB and SRC are the magnetoresistive signal resistance from the respective sections A, B and C.

The total signal V1 + V2, besides a DC component, is equal to SRA +SRB +SRC. The center-tap 14, according to the present invention, is made of a high resistivity material. As such, the center-tap 14 shunts very little current from the current I directed into the outer lead 18. Since the center-tap 14 is of a high resistivity compared to the outer conductors 16 and 18 and the MR element 20, the center-tap 14 drains very little current from the electrical current I and therefore does not introduce a dead zone into the MR element 20 at the section B. This is an especially critical region for narrow track applications where the center-tap 14 could cover one-third of the total surface of the MR element 20 between the outer conductors 16 and 18. The high resistivity of the center-tap 14 does not disturb the magnetic configuration or the bias entered into the MR element 20. Many bias schemes for the MR element 20 could be used, such as soft film bias, shunt bias, patterned exchange longitudinal bias or hard magnetic longitudinal bias.

The difference in the voltage outputs, V1 − V2, is equal to SRA - SRC. With the center-tap 14 selfaligned to the outer leads 16 and 18, the difference in the outputs from the outer leads 16 and 18 would be zero if the head is aligned with the data track 22. Therefore the difference in the outputs from the three leads can be used as a position error signal to control the tracking control device 26, as shown in FIG. 1.

Suitable materials for the center-tap 14 are any materials having a resistivity higher than the materials used for the MR element 20 or the outer leads 16 and 18. Examples of such a material are tantalum, Nichrome, or sputtered carbon films. The center-tap 14 can likewise be of a thinner construction, such as shown in FIG. 2, in order to further increase the resistivity of the center-tap 14. For purposes of the present invention, a high resistivity is taken to mean a resistivity greater than the resistivity of the MR element 20 per unit length. The unit for resistivity is Ohm per square area of the film. The value is obtained by dividing the material resistivity by the thickness of the film. In typical applications, the sheet resistance of the MR element 20 between the leads 16 and 18 range between 5 and 10 Ohm per square area of the films. The sheet resistance of the outer leads 16 and 18 are generally much smaller than the MR element. Preferably the sheet resistance of the center tap layer 14 should be ten times that of the MR element 20 to make the current shunted from the sensor to be one-tenth of the total.

Two fabrication methods to make the high resistivity center-tap 14 self-aligned to the edges of the track 22, are shown in FIGS. 3 and 4. The process shown in FIG. 3 uses a thin insulator to define both the track sections A, B and C of FIG. 2, and the center-tap 14.

Referring to FIG. 3, the first step as shown in FIG. 3(a) is to pattern the MR element 20 structure and to deposit a thin insulating layer 30 of a material such as aluminum oxide over the entire substrate 10. The MR element 20 includes a layer 32 of the MR material such as nickel-iron, a non-magnetic spacer layer 34 and a soft film bias layer 36 made of tantalum, for instance. A resist masking layer 38, as shown in FIG. 3(b), is applied, baked, exposed and developed to define a center-tap region 40 as well as the conductor lead regions 42 and 44. A selective etch process then removes the insulative layer 30 from the MR element 20 except those areas covered by the resist masking layer 38. A high resistivity center-tap layer material 46 is then deposited over the entire wafer. The resist masking layer 38 is then lifted off using conventional organic solvents, for instance, leaving the high resistivity center-tap layer material 46 in the position of the center tap 40 and in the positions of the outer conductors 42 and 44, as shown in FIG. 3(c). The layer of insulating material 30 is left separating the different conductor sections. As shown in FIG. 3(c), the track width is formed between the outer conductor sections 42 and 44 and is the same as the sections A, B and C of FIG. 2.

In FIG. 3(d), a resist masking layer 50 is applied, baked, exposed and developed to protect the center-tapped region 40 but to expose the previously defined conductor regions 42 and 44 in the insulating layer. The high resistivity layer is etched away in the outer conductor areas 42 and 44. The removal process used in etching away the high resistivity layer depends on the choice of material for the high resistivity centertap. For tantalum, a sputter etch or ion milling process can be used. For Nichrome, a chemical etch will remove the unwanted material. For a carbon center-tapped lead, a reactive etch in oxygen can be used to remove the unwanted sections of the high resistivity layer.

As shown in FIG. 3(e), a conductor lead metalurgy 52 is then deposited over the entire wafer. The resist masking layer 50 is then removed through a lift-off process, for instance, with conventional organic solvents as shown in FIG. 3(f).

As shown in FIG. 3(f), the magnetic head includes the MR element 20, the center-tap 14, and the outer conductors 16 and 18.

The magnetic head shown in FIG. 2, together with the process described in FIG. 3(a-f) is compatible with other longitudinal bias procedures. To implement the hard bias contiguous junctions, for example, the process shown in FIG. 3(e) needs to be modified to completely remove the passive region and then deposit the hard bias film and conductor lead metallurgy. A separate lead connection is then required to the high resistivity center-tap. This could be accomplished by leaving an MR pattern in addition to the MR sensor and using that pattern for the connection between the center-tap, covering the MR element, and the eventual lead to the outside world.

Another procedure for fabricating a magnetic head according to the present invention does not use the insulator defined track width, but instead uses a different photo process. First, the MR element structure is patterned and a resist masking layer is deposited to define both the center-tap region as well as the conductor lead regions as shown in FIGS. 3(a) and (b). The high resistivity center-tap material 46 is deposited such as shown in FIG. 3(b). A resist masking layer 60, as shown in FIG. 4, is applied, baked, exposed and developed to protect the center-tap region 40 and to expose the previously defined outer conductor sections 42 and 44 in the first resist layer. The high resistivity layer 46 is then etched away in the area of the outer conductors 42 and 44. The conductor lead metallurgy 52 as shown in FIG. 3(e) is then deposited. A resist masking layer 60 of FIG. 4 is then lifted off with conventional organic solvents to produce a magnetic head such as shown in FIG. 3(f).

While the invention has been particularly shown and described with reference to preferred embodiments thereof, it will be understood by those skilled in the art that various changes in form and details may be made therein without departing from the spirit and scope of the invention. The appended claims are therefore intended to cover and embrace any such modification within the limits only of the true spirit and scope of the invention.

What is claimed is:

1. A magnetic head for sensing magnetic signals recorded in a track on a magnetic recording medium, said head comprising:
   a substrate;
   a thin strip of a material having magnetoresistive properties deposited on the substrate, said strip being deposited such that the strip can be placed adjacent to the recording medium with the length of the strip being approximately equal to the width of the track on the recording medium for sensing the recorded magnetic signals;
   outer conductors electrically connected to each end of said strip;
   a center conductor electrically connected to said strip approximately central between said outer conductors; and
   said center conductor being formed of a material having a higher electrical resistivity than said thin strip of magnetoresistive material.

2. A magnetic head as described in claim 1 wherein said center conductor has an electrical resistivity at least ten times greater than the resistivity of said thin strip of magnetoresistive material per unit length.

3. A magnetic head as described in claim 1 wherein the material for said center conductor is selected from the group consisting of tantalum, nickel-chromium oxide and carbon.

4. A magnetic head as described in claim 1 further including a write element to write the magnetic signals on the magnetic recording media.

5. A magnetic head as described in claim 1 further including:
   means for amplifying the magnetic signals sensed by said thin strip of magnetoresistive material;
   means for separating the magnetic signals amplified by said amplifying means into data and servo error signals; and
   track control means controlled by the servo error signals to position the magnetic head over the track.

6. A head assembly for sensing magnetically recorded information from a medium and operable to provide servo information, said assembly comprising:
   an elongated magnetoresistive element positioned to sense a track of information from the medium;
   outer conductor means electrically connected to said magnetoresistive element approximate to each outer edges along its length;
   a center-tap conductor means electrically connected to said magnetoresistive element approximately central between said outer conductor means;
   means for applying an electrical current to said outer conductor means; and
   means for applying a magnetic operating bias to said magnetoresistive element;
   said center-tap conductor means being made of a material having a higher electrical resistivity than said magnetoresistive element per unit length.

7. A head assembly as defined in claim 6 wherein said center conductor has an electrical resistivity at least ten times greater than the resistivity of said thin strip of magnetoresistive material per unit length.

8. A head assembly as defined in claim 6 wherein the material for said center conductor is selected from the group consisting of tantalum, nickel-chromium oxide and carbon.

9. A head assembly as defined in claim 6 further including a write element to write the magnetic signals on the magnetic recording media.

10. A head assembly as defined in claim 6 further including:
    means for amplifying the magnetic signals sensed by said thin strip of magnetoresistive;
    means for separating the magnetic signals amplified by said amplifying means into data and servo error signals; and
    track control means controlled by said servo error signals to position the magnetic head over the track.

11. A device for the automatic control of the position of a magnetic head with respect to a selected information track on a magnetic recording medium, said devices comprising:
    a track controlling means for positioning the magnetic head adjacent to the selected information track;
    a magnetoresistive element positioned to sense information recorded on the selected information track;
    outer conductor means electrically connected to said magnetoresistive element approximate to its outer edges;
    a center-tap conductor means electrically connected to said magnetoresistive element approximately central between said outer conductor means, said center-tap conductor means being made of a material having a higher electrical resistivity than said magnetoresistive element;
    means for applying an electrical current to said outer conductor means;
    means for applying a magnetic operating bias to said magnetoresistive element;
    means connected to said outer and center-tap conductor means for amplifying the information sensed by said magnetoresistive element; and
    means connected to said amplifying means for separating the amplified sensed information into data and servo error signals;
    said servo error signals being directed to said track controlling means for holding the magnetic head in position relative to the selected information track.

12. A device as described in claim 11 wherein said center-tap conductor means has an electrical resistivity at least ten times greater than the resistivity of said magnetoresistive element per unit length.

13. A device as described in claim 11 wherein the material for said center-tap conductor is selected from the group consisting of tantalum, nickel-chromium oxide and carbon.

* * * * *